Nov. 7, 1967 H. KRAIKER, JR 3,351,550
METHOD FOR SERIES WATER SOFTENING AND SERIES REGENERATION
Filed March 6, 1964 2 Sheets-Sheet 2
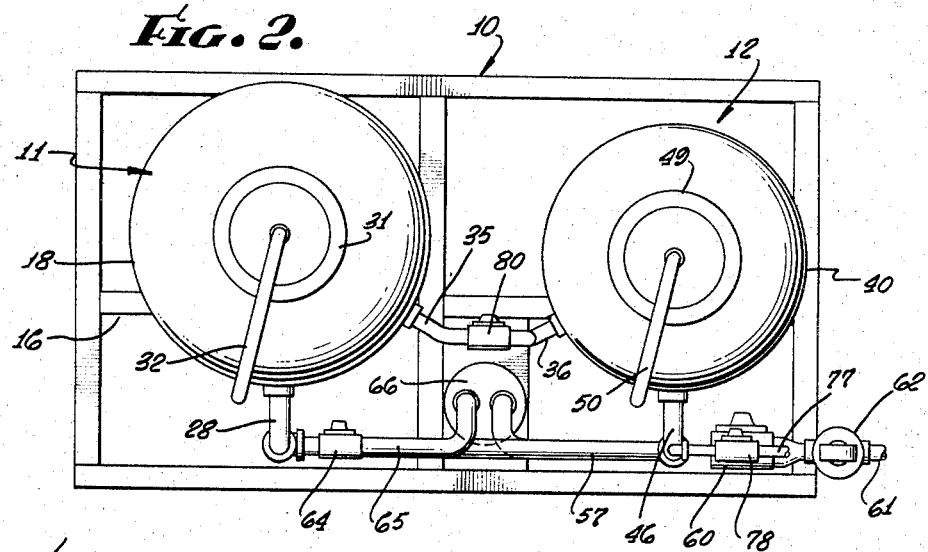
INVENTOR.
HARRY KRAIKER, JR.
BY Miketta & Glenny
ATTORNEYS.

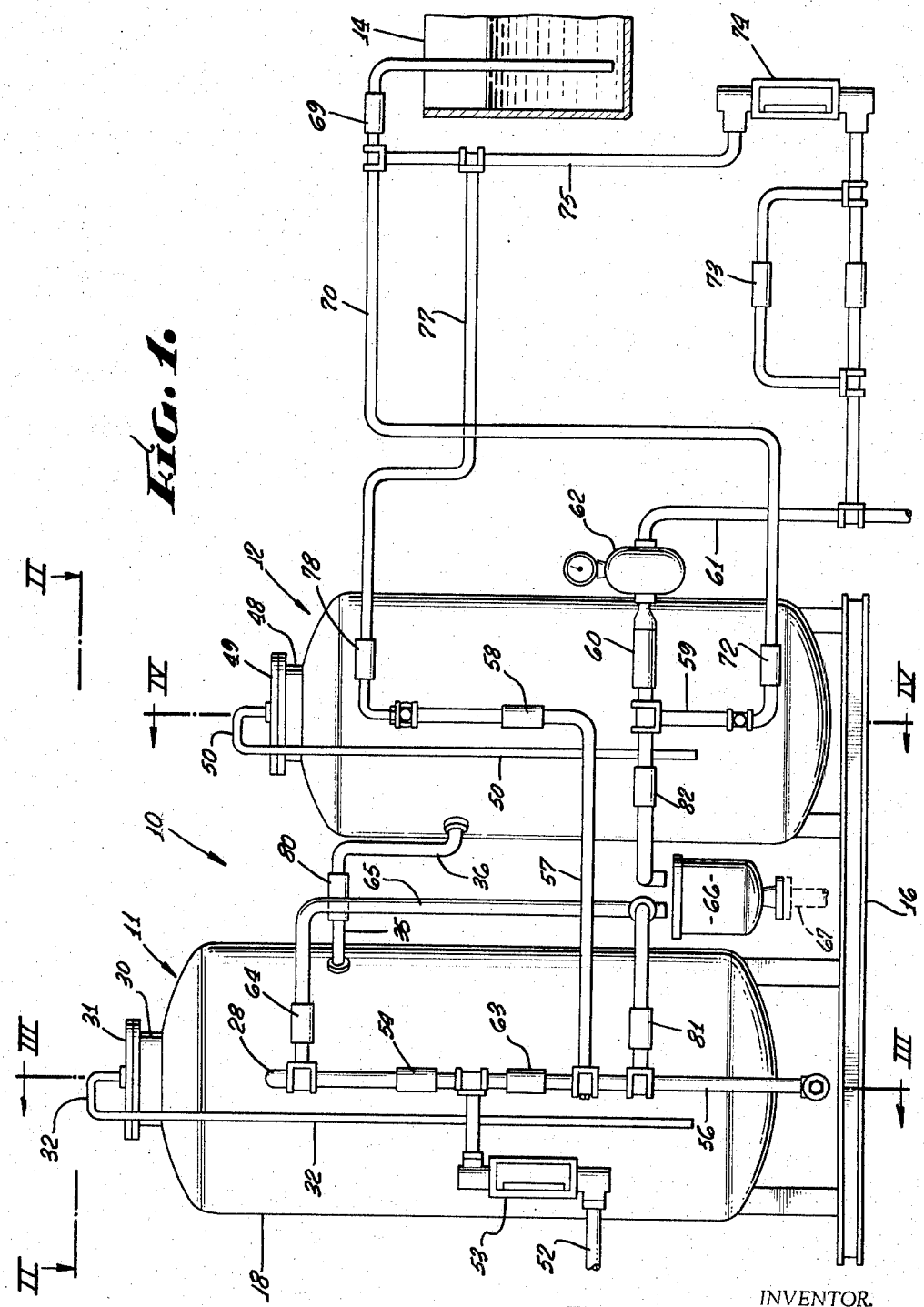

United States Patent Office 3,351,550
Patented Nov. 7, 1967

3,351,550
METHOD FOR SERIES WATER SOFTENING AND SERIES REGENERATION
Harry Kraiker, Jr., West Covina, Calif., assignor, by mesne assignments, to Water Treatment Corporation, City of Industry, Calif., a corporation of Delaware
Filed Mar. 6, 1964, Ser. No. 349,890
5 Claims. (Cl. 210—34)

This invention relates to a water conditioning system and more particularly to a method and apparatus for softening water by employing a zeolite or other similar material.

Hardness characteristics of water are usually expressed in terms of parts per million (p.p.m.) of calcium carbonate. Water which is considered as very hard water includes up to 5,000 p.p.m., whereas soft water may include water of about 2–5 p.p.pm. In prior proposed zeolite-type softening units, a tank containing a single bed of zeolite material having a selected depth has been employed and such zeolite bed has required regeneration upon exhaustion of the resin after treating a certain amount of water. Attempts to achieve extreme low hardness of water by such prior proposed systems, such as in the nature of less than one p.p.m., have included increasing the depth of the resin bed, reducing the amount of water passing through such a bed before its regeneration and regenerating the zeolite bed with an increased salt dosage or concentration of the regenerating solution. Such prior proposed methods of increasing the effectiveness and efficiency of the single softening unit have not achieved the very low hardness presently demanded and have simply increased the cost of such modified softening system.

It is presently desired that such an extremely low hardness effluent that is not more than one p.p.m. be secured from a sodium zeolite type softening system. The present invention contemplates an apparatus and method for obtaining such a very low hardness effluent, for example, an effluent in the vicinity of 5/10 p.p.m., by employing an apparatus and a method which reduces the amount of salt dosage, which does not increase depth of the resin bed in any one softening unit and which does not require a reduction in the number of gallons of raw water introduced normally to such a system.

Generally, speaking, the present invention contemplates a sodium zeolite softening system comprising a first or primary softening unit adapted to receive raw water and to almost completely or substantially soften said water. A second or polishing, softening unit is arranged in series with the first unit and receives the substantially soft water from the first unit and then further softens or removes the remaining hardness from the effluent of the primary unit so that the effluent from the second unit which is to be used is of an extremely low hardness, that is, less than one p.p.m. and usually in the range of 5/10 p.p.m. The raw water is thus processed in at least two steps and in a series arrangement of at least two softening units. The second or polishing unit has little work to do and thereby affords positive assurance that its effluent will be of very low hardness.

The series arrangement of primary and polishing units also facilitates a novel arrangement of regeneration in series so that a relatively low or reasonable salt dosage may be used as compared with normal practice. Regeneration solution such as brine is first passed through the resin bed of the polishing unit which bed has been only partially used for removal of only the remaining hardness leakage of the effluent from the primary unit. Thus, regeneration of the polishing unit before regeneration of the primary unit assures complete regeneration of the polishing unit. The regenerating solution passed through the polishing unit is then used to regenerate the primary softener in customary fashion. Regeneration of the polishing unit is accomplished by employing a blocking flow of dilution water so that the resin bed of the polishing unit is not expanded.

The primary object of the present invention therefore is to disclose and provide a novel method and apparatus for softening water.

An object of the invention is to provide a water softening system employing a series of softening units for achieving an extremely low hardness effluent from said system.

Another object of the invention is to disclose a water softening system wherein softening units arranged in series may be regenerated with a relatively low salt or regenerant solution.

Another object of the invention is to disclose a water conditioning system so arranged and operated so that extremely low hardness effluent is positively assured.

A further object of the invention is to disclose a water conditioning system which is capable of achieving the above objects while effecting economies in operation and cost of regenerant solutions.

Other more specific objects of the invention are to disclose and provide a water softening system of zeolite type wherein utilization of a second or polishing softening unit provides effluent of extremely low hardness; wherein complete regeneration of the polishing unit is assured; wherein the resin particles in the polishing unit are held against upward expansion during regeneration by a blocking flow; wherein backwashing of the resin bed of the polishing unit is not required; and wherein an efficient, effective water softening system is arranged for series operation in both the water softening process and in the regeneration process of the system.

Other objects and advantages of the present invention will be readily apparent from the following description of an apparatus and method embodying the present invention as exemplarily illustrated in the following drawings and description.

In the drawings:

FIG. 1 is an elevational view of a water softening system embodying this invention, the piping being schematically shown.

FIG. 2 is a top plan view of a major portion of FIG. 1.

FIG. 3 is a vertical sectional view taken in the plane indicated by line III—III of FIG. 1; and FIG. 4 is a vertical sectional view taken in the vertical plane indicated by line IV—IV of FIG. 1.

In FIG. 1 a water conditioning or softening system embodying the present invention is generally indicated at 10 and may comprise a primary softening unit or means 11 and a secondary softening unit or means 12 interconnected in series by piping means later described for processing water to be treated in a series of steps so that a virtually hardness-free effluent will be obtained. The interconnection in series of the primary and secondary units also provides for regeneration of said units in series fashion whereby the system will be regenerated in its entirety by a combination of regeneration steps as later described. The water softening system 10 also includes a brine storage tank 14 which provides a regeneration solution.

In the present example the apparatus for practicing the method of the invention includes a suitable base frame means 16 upon which the primary and secondary units 11 and 12 may be supported in well known manner. The primary softening unit 11 may comprise a vertical cylindrical tank 18 of selected height and diameter. The primary tank 18 contains a column of resin 19 which may be supported over a suitable bed of gravel containing stratas of fine gravel 20, medium gravel 21 and coarse gravel 22. In the coarse gravel strata is positioned a bottom distributor 23 connected to a bottom pipe 24. The resin bed 19 has a preselected depth and in the present example its top surface 26 is at approximately the middle portion of the vertical tank 18.

Above the resin bed 19 is provided a freeboard space 27. An inlet pipe 28 enters the top portion of the freeboard space 27 and may be provided with upwardly directed spray type water distributing heads 29. A top manhole 30 having a cover 31 may be connected with a vent or overflow pipe 32 which extends downwardly along the side of the tank 18. Between the inlet pipe 28 and the top of the resin bed, a regeneration distributor 34 may be spaced a selected distance above the top of the resin bed and connected to a pipe 35 connected with the regeneration pipe 36 which supports a distributor 37 a relatively short distance above the top surface 38 of a resin bed 39 contained within the vertical tank 40 of the secondary softening unit 12.

The secondary softening unit 12 also includes a gravel sub-fill 42 for supporting the resin bed 39. At the bottom of the gravel sub-fill may be provided a bottom distributor 43 having its ports protected by suitable screen material such as a saran screen. The bottom distributor 43 is connected to a pipe 44 which serves to discharge the final effluent from the system and which also serves to permit introduction of the regeneration solution. Above the resin bed 39 and above the pipe 36 may be provided an inlet pipe 46 which may carry a suitable spray distribution head 47 for introducing water to the secondary tank 40. The tank is provided with a manhole 48 having a cover 49 provided with a vent pipe 50.

The type of zeolite material used in resin beds 19 and 39 may be the same and may include a high capacity polystyrene cation resin available and sold under the tradenames of Nalcite HCR; Amberlite IR–120; and Duolite C–20. Other types of zeolite materials such as medium capacity polystyrene resins, gel type zeolites and natural zeolites may be employed depending upon the hardness of the water to be treated. The amount of resin in the primary softening resin bed 19 is greater than the amount of resin in the secondary softening resin bed 39, and in this example the resin bed 19 may comprise twelve cubic foot of resin material while the resin bed 39 may comprise eight cubic foot of resin material. It may be noted that the height or depth of the resin bed in each unit is approximately the same and that the diameter of the primary softening unit tank 18 is somewhat greater than the diameter of the secondary softening unit tank 40.

The practice of the method of this invention by the exemplary apparatus described above includes the introduction of raw water at inlet pipe 52, FIG. 1. The original hardness of the raw water has been determined and expressed as p.p.m. of calcium carbonate. The rate of flow of the introduction of the raw water influent may be determined by a suitable water flow meter device 53 provided adjacent the primary unit 11. Such a water flow meter device is available and sold under the trademark Rotameter. The raw water influent is conducted through primary inlet valve 54 to the inlet pipe 28 and the distributor head 29 where the influent is distributed uniformly over the top surface 26 of resin bed 19. The influent passes downwardly through resin bed 19 and the gravel sections and is discharged through bottom distributor 23 and bottom pipe 24. As the water passes through the zeolite resin bed 19 the resin removes the calcium and magnesium in the influent and replaces it with sodium. The primary resin bed is designed so that substantially all of the hardness in the raw water will be removed in its passage through the primary softening unit.

The treated effluent from the primary softening unit is then conducted through bottom pipe 24 through vertical pipe 56 to transfer pipe 57 which is provided with a secondary inlet valve 58 and which connects with top inlet pipe 46 of the secondary unit so that the substantially soft water primary effluent is distributed through head 47 for further processing within the secondary softening unit 12. As the softened primary effluent is passed through the secondary unit resin bed 39 any hardness remaining therein will be removed and the final secondary effluent, which is discharged through distributor 43 and outlet pipe 44 to discharge pipe 59 and through opened secondary outlet valve 60, will then be conducted through pipe 61 to service, i.e., the equipment for which the water has been softened. A meter 62 provided in pipe 61 indicates the quantity of effluent discharged from the secondary softening unit.

It is important to note that the primary softening unit 11 substantially completely softened the raw water before the water was discharged from the primary unit. Thus, the primary effluent, when introduced to the secondary softening or polishing unit 12, requires only little further softening if any in order to remove any remaining hardness in the primary effluent. Thus, the secondary softening unit has little actual softening to do and is only partially or slightly exhausted at the time the primary resin bed 19 approaches almost complete exhaustion. Such series treatment of the primary effluent always assures that the final effluent from the water softening system will have extremely low hardness, normally under .5 p.p.m., and less than 1 p.p.m.

Operation of the regeneration cycle of the primary and secondary units involves the employment of several valves in a selected time sequence either manually or automatically operated. An automatic operation is preferred and may include a control device comprising a timer and a rotary type multi port valve positioned by a synchronous motor and ported to actuate by fluid pressure a valve known as a Clayton valve for regenerating the system. Timing of each step of the regeneration cycle is provided by an electric program timer. The details of the controller are not described because their use in water softening equipment is known. In addition to the primary inlet valve 54 and secondary inlet and outlet valves 58 and 60 referred to in the description of the service cycle the following valves are identified to facilitate description of the regeneration cycle, such valves being namely: a primary backwash inlet valve 63 located below valve 54; a primary backwash outlet valve 64; a concentrated brine valve 69, a dilution bypass valve 73; a brine secondary inlet valve 72; a brine secondary outlet valve 80; a brine primary waste valve 81; a secondary dilution valve 78; and a secondary rinse valve 82. Since regeneration of the entire system requires opening and closing of the above valves in certain sequences and combinations, to facilitate description the valves will be considered in closed position except where valves are stated to be in open position. In a normal water softening cycle valves 54, 58 and 60 are in open position.

When it is required to regenerate the exhausted primary softening resin bed 19, the entire softening system, that is both primary and secondary softening units, are regenerated even though the secondary resin bed 39 is only slightly exhausted. In the regeneration cycle primary unit 11 may be first backwashed by introducing raw water from pipe 52 to bottom pipe 24 and distributor 23 for upflow of raw water through resin bed 19. During backwashing the primary backwash inlet valve 63 and outlet valve 64 are open. Backwash of the primary resin bed 19 is performed in usual manner so as to flush dirt and turbidity from the resin bed and to prepare it for a regeneration solution or brine. The upflowing backwash water is removed from the freeboard space above resin bed 19 through the distributor header 29 and top pipe 28 and is then passed through the primary backwash outlet valve 64 downwardly through drainpipe 65 which discharges the backwash water into a drain 66 connected with a waste disposal pipe 67.

Upon completion of backwashing the primary softening unit brine which is stored in brine tank 14 and which comprises a selected concentration of salt may be pumped into the system from tank 14. Upon opening brine valve 69, dilution water valves 73 and 78, and brine valves 72, 80 and 81, the brine solution may flow through brine pipe 70 and through valve 72 to introduce the brine solution through pipe 44 to bottom distributor 43 at the bottom of the secondary resin bed 39 of unit 12. Opening of valve 73 introduces soft dilution water to pipe 70 downstream from brine valve 69 and also introduces soft dilution water to pipe 77 for passage through secondary dilution valve 78, the valves 73 and 78 being adjusted to provide a selected dilution of concentrated brine so that a preselected salt dosage may be used to treat the resin beds. Brine solution flows upwardly through the slightly exhausted secondary resin bed 39 and since any hardness ions removed previously from the primary effluent are disposed substantially at the top section of the resin bed, the upflow regeneration of secondary bed 39 removes such hardness ions upwardly and thereby prevents possible passage downwardly through the resin bed of a stray ion carrying resin particle. Thus, the upflow regeneration of the secondary resin bed 39 brings the freshest brine solution into contact with the most highly regenerated resin and the secondary resin bed is always kept at a maximum degree of regeneration without waste of brine. After the brine solution passes above surface 38 of resin bed 39 it is caused to enter distributor 37 which is located only a few inches above top surface 38. The brine solution is then conducted through pipe 36 out of the secondary unit 12 and to the primary unit 11. Such brine solution flow is caused by the use of a blocking flow of soft dilution water introduced through top distributor 47 at such a flow rate with respect to the flow rate of the upflowing brine solution that the brine solution is held below the top portion of distributor 47 and is required to enter distributor 37. The flow of dilution water may be regulated by a dilution flow metering device 74. The blocking flow of dilution soft water not only assures that the brine solution does not flow above the distributor 37 but also assures that particles in the resin bed 39 will not be dislodged and carried into the freeboard space above distributor 37. In effect the blocking flow of dilution water holds the resin bed in virtually fixed position and prevents the resin bed from becoming sufficiently fluid so as to set up currents therein which might dislodge resin particles and which might become relocated further downwardly in bed 39. Thus, positive means are provided for preventing hardness ions carried by resin particles of the secondary bed from leaking into the completely softened water effluent which flows out of bottom distributor 43.

After regeneration of the secondary resin bed 39 the brine solution is conducted through pipe 36 through brine outlet valve 80 to pipe 35 and distributor 34 in the primary softening unit tank 18. The brine solution passes through distributor 34 over the resin bed 19 and flows downwardly through the resin bed for regeneration thereof in usual well known manner. Brine solution flowing through distributor 23 and out bottom pipe 24 is conducted through pipe 56 to brine outlet valve 81 to drainpipe 65 for discharge into drain 66.

Displacement of the brine solution from the softening units 12 and 11 may be accomplished in series fashion by closing brine valve 69 and simultaneously further opening dilution water valve 73 so that additional dilution water will flow through the secondary resin bed 39 and then through the primary resin bed in the same flow path as the brine solution. The displacement flow rate should be at least equal to the brine solution flow rate and may be increased to shorten the time required for the displacement step. Upflow of dilution water through the secondary resin bed 39 effects a slow rinse of the secondary bed. Dilution water is passed downwardly through the primary resin bed 19 and thence outwardly through the bottom distributor to the drain.

Upon completion of the displacement step in the regeneration cycle rinsing of both primary and secondary resin beds may be commenced. In the rinsing of the primary resin bed 19 valves 54 and 81 are in open position and raw water is passed downwardly through resin bed 19 to remove the brine solution. When the brine solution is removed valves 54, 58 and 82 are in open position so that the primary effluent will be passed through the secondary resin bed 39. After rinsing of the secondary bed 39 with the primary effluent the water softening system is again ready for service and valves 54 and 58 are then placed in open position so that the service cycle may commence.

In the practice of the series softening and series regeneration method described above it will be understood that dilution water for the brine solution is preferably softened water and that suitable filters may be employed with respect to the raw water influent. Depending upon the total hardness and total dissolved solids present in the raw water to be treated, adjustments of flow rate, time periods for different steps of the process, and quantity of salt used may be varied to provide the very low hardness desired.

An example of reduced salt dosage which may be achieved by the present water softening system as compared to a single softening unit is set forth below. If in a single softening unit 15 pounds of salt per cubic foot of resin secures minimum hardness leakage with a yield of 30 kilograins per cubic foot this is equivalent to 0.5 pound of salt per kilograin of hardness removed. In the present series arrangement of primary and polishing units, the salt dosage may be reduced to about 6 pounds per cubic foot of resin in the primary unit and with a yield rated at 20 kilograins per cubic foot; this is equivalent to 0.3 pound of salt per kilograin of hardness. A 40% savings of salt is accomplished. This savings is directly attributable to the very large reserve factor provided in the secondary resin bed which is capable of treating any hardness leakage from the primary unit.

It will be understood that the counterflow or blocking flow provided in the secondary unit is also very effective in maintaining high reserve conditions of the secondary resin bed. The secondary resin bed is not permitted to expand upwardly above its distributor and since the resin particles retain their approximate position during upflow regeneration, downward migration of resin particles does not occur. Thus the major portion of the secondary resin bed contains fully regenerated resin particles which are effective to remove all hardness leakage from the primary effluent and which is not removed by the top portion of the bed. In this respect it is important to note that the regeneration cycle does not require backwashing of the secondary resin bed since such backwashing may disturb desired arrangement of resin particles in the bed.

While only one bank of series combined primary and secondary units have been described more than one bank may be used to produce a desired output quantity of softened water. Such plurality of banks of units may be readily interconnected for the regeneration cycle.

It will be understood that all changes and modifications made in the method of and apparatus for practicing this invention and covering within the scope of the appended claims are embraced thereby.

I claim:

1. In a method of conditioning water to provide a virtually hardness free effluent and utilizing a primary softening unit having a primary bed of resinous material and a spaced separate polishing softening unit having a secondary bed of resinous material, the steps of:

introducing raw water to said primary softening unit and passing said water through said primary bed to provide an effluent of low hardness;

transporting said low hardness effluent to said polishing unit;

passing said low hardness effluent through said secondary resin bed to remove any remaining hardness in the effluent;

regenerating said primary and polishing units in their entirety and in series upon approach of a condition of substantial exhaustion of the primary resin bed and only partial exhaustion of the secondary bed; said regeneration including:

backwashing only said primary resin bed whereby said bed is agitated;

passing a regeneration solution upwardly through said secondary resin bed while maintaining a stable fixed unmixed resin bed in said polishing unit;

passing said partially used regeneration solution from the polishing unit to the primary unit;

and passing said partially used regeneration solution through the primary resin bed.

2. In the method of conditioning water as stated in claim 1 including the step of introducing a blocking flow of dilution water into the top of the polishing unit for holding its fixed stable resin bed against expansion and intermixing of resin particles while said regenerating solution is passed upwardly through said bed.

3. In the method of conditioning water as stated in claim 1 including the step of providing a secondary resin bed of less volume than the primary resin bed.

4. In a method of regenerating at least two separated water softening units providing an effluent of low hardness in the order of not more than 1 p.p.m., said softening units being interconnected in series, one unit serving as a primary softener to remove a major portion of the hardness in raw water passed therethrough and the other unit serving as a polishing softener to remove remaining hardness in such water; said regeneration method including the steps of:

backwashing only the resin bed in the primary softener unit;

passing a regeneration solution first upwardly through the resin bed in the polishing softening unit without intermixing in said bed the exhausted resin particles with other resin particles;

and then passing through the resin bed of the primary softening unit, said used regeneration solution from the polishing unit.

5. In a method as stated in claim 4 including the steps of:

introducing dilution water above the resin bed in the polishing softening unit;

and passing said dilution water and regeneration solution from the polishing unit through the resin bed of the primary softening unit whereby the polishing resin bed is treated with a concentrated regeneration solution and the primary softening unit is treated with a diluted regeneration solution.

References Cited

UNITED STATES PATENTS

| 1,485,334 | 2/1924 | Kriegsheim | 210—30 X |
| 3,152,072 | 10/1964 | Yomiyama et al. | 210—33 |

FOREIGN PATENTS

| 602,225 | 7/1960 | Canada. |

JOSEPH SCOVRONEK, *Acting Primary Examiner.*

MORRIS O. WOLK, *Examiner.*

E. G. WHITBY, *Assistant Examiner.*